Oct. 24, 1961   R. C. ZELLER   3,005,324
UNIVERSAL JOINT
Filed Jan. 11, 1960   2 Sheets-Sheet 2
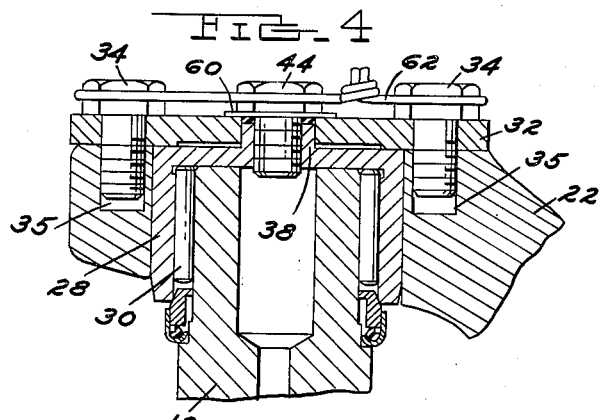
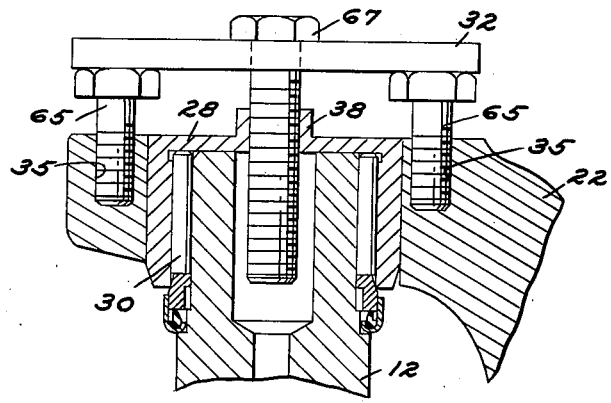
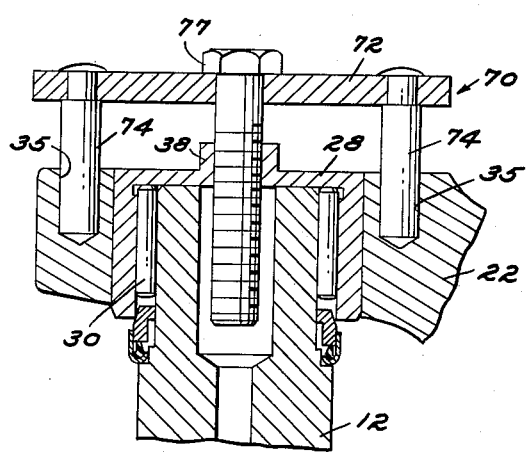
INVENTOR.
ROBERT C. ZELLER
BY
Whittemore, Hulbert & Belknap
ATTORNEYS

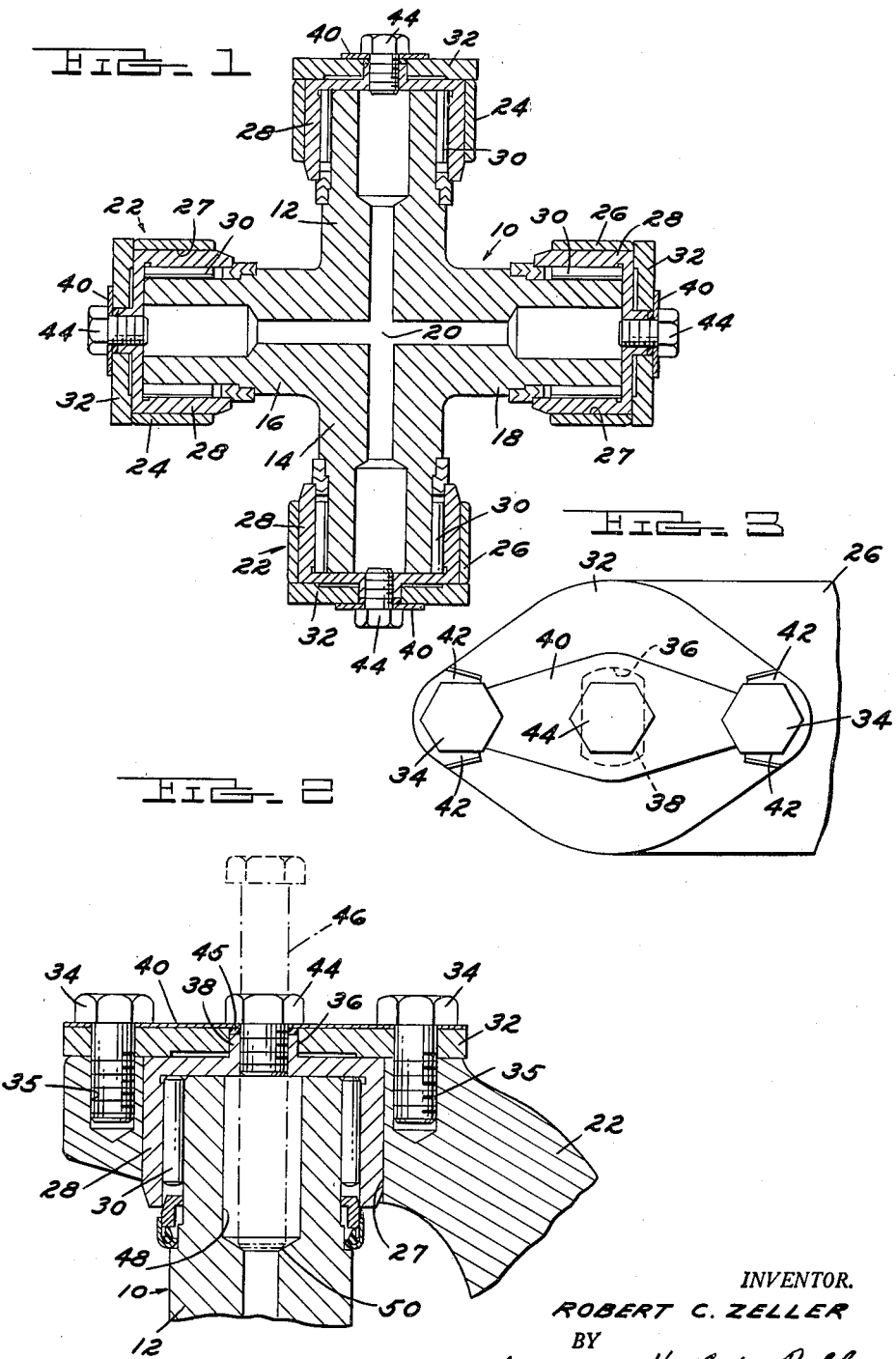

United States Patent Office 3,005,324
Patented Oct. 24, 1961

3,005,324
UNIVERSAL JOINT
Robert C. Zeller, Defiance, Ohio, assignor to The Zeller Corporation, Defiance, Ohio, a corporation of Ohio
Filed Jan. 11, 1960, Ser. No. 1,567
14 Claims. (Cl. 64—17)

This invention relates to universal joints and refers more particularly to universal joints of the type including a central member having pairs of aligned trunnions at right angles to each other and rotary members having bifurcated end bearings respectively engaging the trunnions.

Universal joints of this type are difficult to disassemble, and it is particularly difficult to remove the trunnion bearings which have a tight fit in the rotary members. One object of this invention is to provide a universal joint which is designed to facilitate disassembly, and means for accomplishing this result.

Another object of the invention is to provide an improved universal joint which is capable of being readily disassembled and which, in its assembled condition, incorporates means for preventing the escape of lubricant from the bearing cups.

Other objects and features of the invention will become apparent as the description proceeds, especially when taken in conjunction with the accompanying drawings, illustrating preferred embodiments of the invention, wherein:

FIG. 1 is a longitudinal sectional view through a universal joint embodying the invention, taken in the plane of the axes of the trunnions;

FIG. 2 is a fragmentary sectional view taken at right angles to FIG. 1;

FIG. 3 is an elevational view of the structure shown in FIG. 2;

FIG. 4 is a view similar to FIG. 2 showing a modification; and

FIGS. 5 and 6 illustrate alternate methods of disassembling the universal joint.

Referring now more particularly to the drawings, and especially to FIGS. 1, 2 and 3, the universal joint there illustrated comprises a central member 10 having a first pair of trunnions 12 and 14 and a second pair of trunnions 16 and 18. The axes of the pair of trunnions 12 and 14 are aligned and the axes of the trunnions 16 and 18 are aligned and at right angles to the aligned axes of trunnions 12 and 14. The trunnions lie in a common plane and their axes intersect at the point 20.

Each rotary member 22 has a bifurcated end portion, the furcations 24 and 26 of which are spaced equally from its axis of rotation and have apertures 27 to receive the trunnions of one pair. The bearings for the trunnions are, however, separate members 28, each cup shaped as illustrated and forming an annular race portion for rollers 30 between the bearing cup and the trunnion. One method of assembling the structure as thus far described is to arrange the trunnions of one pair at an angle permitting insertion of one of the trunnions through the aperture in one of the furcations and then turning it and moving it outward sufficiently for engagement of the opposite trunnion with the other furcation. The bearing cups 28 may then be inserted from the outer end of each furcation.

In order to lock the bearing cups in position in the apertures 27 of the respective furcations, bearing plates 32 are provided. Each bearing plate is secured to the associated furcation by cap screws 34 threaded into tapped holes 35. Each bearing plate has end apertures to freely receive the shanks of screws 34, and a central aperture 36 which has the non-circular form shown in FIG. 3 to closely receive the boss 38 integral with and formed on the outer side of the base of the bearing cup. Each boss 38 has the same non-circular cross-section as the aperture in which it is received so that the bearing cup is thereby held against rotation. A lock strap 40 overlies each bearing plate and has apertures at the ends freely receiving the shanks of cap screws 34. The lock strap is formed of a resilient material such as hardened steel and is formed with a pair of turned-up ears 42 at each end which are deformed and clamped tightly by the heads of cap screws 34 to resist loosening of the cap screws.

The lock strap has a central opening through which the shank of cap screw 44 freely passes for threaded engagement in the aperture of boss 38. The boss 38 is shorter in axial dimension than the aperture 36 in the bearing plate to provide a recess between the end of the boss and the lock strap. A washer 45 of a suitable resilient compressible sealing material such as neoprene surrounds the shank of cap screw 44 and is disposed in the recess. The washer has the same peripheral contour as the aperture 36 so as not to rotate in the recess and in its free state is slightly thicker than the recess. Hence when the cap screw is tightly applied, the neoprene washer is compressed between the lock strap and the end of the boss in sealing engagement therewith. The washer is also compressed radially so as to sealingly engage the wall of the aperture 36 as well as the shank of cap screw 44.

The compression of the washer together with the slight deformation of the lock strap in its central region when cap screw 44 is tightened produces an outward force against the underside of the head of the cap screw to prevent it from working loose. Lubricant within the bearing cup is thus effectively sealed against escape through the aperature in the boss and in the bearing plate.

In order to disassemble the universal joint, and particularly to remove the tight fitting bearings from the apertures in the associated furcations of the rotary memmembers, the cap screws 34 and 44, bearing plate 32 and lock strap 40 are removed. A cap screw 46, somewhat longer than cap screw 44 and shown in phantom lines, is threaded into boss 38 so that its shank extends into the recess 48 of the trunnion for engagement of its end with the shoulder 50 at the bottom of the recess. By continued rotation of cap screw 46, with the end thereof engaging shoulder 50, the bearing cup is caused to lift axially from its snug engagement in the aperture of the furcation and is thereby readily removed.

The recesses 48 extend along the axes of the trunnions, and are reduced in cross-section to form the shoulders 50. However the recesses may be continued inwardly without reduction so as to intersect, and in this instance, a screw similar to cap screw 46 may be threaded in the boss of the diametrically opposite bearing cup and its free end serve as the abutment for the screw 46 in the removal of a bearing cup.

The construction shown in FIG. 4 is similar to that shown in FIGS. 1 and 2 and hence corresponding parts are identified by the same reference numerals.

FIG. 4 differs from FIGS. 1 and 2 in that in place of the lock strap a plain steel washer 60 and a lock wire 62 are provided. The lock wire extends through transverse openings in the heads of the cap screws 34 and 44 to prevent rotation thereof and the ends of the wire are twisted together to prevent the wire from working loose. The steel washer 60 compresses the neoprene washer in the same manner as the lock strap and the compressed neoprene washer and slightly deformed steel washer bear outwardly on the underside of the head of cap screw 44 to hold it tight.

To disassemble the joint of FIG. 4, the lock wire 62, bearing plate 32 and cap screws 34 and 44 are removed for engagement of the screw 46 in the boss of the bearing cup to effect its removal in the same manner.

FIG. 5 shows an alternate method and structure for removing the bearing cups. In this instance, a universal joint constructed as in FIGS. 1–4 is provided and the bearing plate and cap screws are removed as before. Cap screws 65 and 66 are threaded in the tapped holes 35 of the furcation normally engaged by cap screws 34, the cap screws 65 being somewhat longer than cap screws 34 to project outwardly of the furcation as shown. The disassembled bearing plate 32 is then laid loosely over the heads of the cap screws 65 and a cap screw 67 passing freely through the central hole in the bearing plate threadedly engages the boss 38. As the cap screw 67 is rotated and threads into the boss, its head engages the bearing plate so that further rotation will effect removal of the bearing cup. Rather than substitute the screws 65 for screws 34, the screws 34 may be employed with the bearing plate laid over the heads thereof. Preferably however in this instance, the cap screws are backed off somewhat to raise the bearing plate to substantially the position shown in FIG. 5.

FIG. 6 shows a second alternate method and structure for removing the bearing cups in which a device 70 is employed. After the bearing plate and cap screws are removed, the device 70 is applied to the furcation. The device 70 includes a transverse plate 72 having pins 74 rigidly secured to opposite ends thereof which extend freely into the threaded holes 35 and bear on the bottoms of these holes. The transverse plate 72 is supported in spaced relation beyond the bearing cup and a cap screw 77 passes freely through an aperture in the plate and threadedly engages in boss 38 of the bearing cup. When the cap screw 77 is rotated with its head in engagement with plate 72, the bearing cup is withdrawn.

What I claim as my invention is:

1. A universal joint comprising a center member having pairs of trunnions with the axes of each pair in the same plane at right angles to the axes of the trunnions of the other pair, rotary members having bifurcated end portions supporting the respective pairs of trunnions, a separate bearing cup for each trunnion engageable in the corresponding furcation of said rotary members, an apertured bearing plate overlying the base of said bearing cup and removably secured to said furcation to hold said bearing cup assembled on said trunnion, an aperture in said base of said bearing cup in register with the aperture in said bearing plate, and means normally sealing said apertures against the escape of lubricant from said bearing cup.

2. A universal joint comprising a center member having pairs of trunnions with the axes of each pair in the same plane at right angles to the axes of the trunnions of the other pair, rotary members having bifurcated end portions supporting the respective pairs of trunnions, a separate bearing cup for each trunnion engageable in the corresponding furcation of said rotary members, a bearing plate overlying the base of said bearing cup and removably secured to said furcation to hold said bearing cup assembled on said trunnion, means for preventing relative rotation between said bearing plate and bearing cup including a non-circular aperture in said bearing plate and a boss of mating non-circular cross-section on said bearing cup received in said aperture, a threaded aperture in said boss, and means normally sealing said apertures against the escape of lubricant from said bearing cup.

3. A universal joint as in claim 2 in which said sealing means includes a screw extending through said first and second mentioned apertures in threaded engagement with the latter, and a sealing washer clamped against the end of said boss by the head of said screw.

4. A universal joint as in claim 3 in which said washer is formed of a resilient, compressible sealing material, and a metal member between said sealing washer and the head of said screw, said metal member being resiliently clamped against said bearing plate by said head and into sealing engagement with said sealing washer.

5. A universal joint comprising a center member having pairs of trunnions with the axes of each pair in the same plane at right angles to the axes of the trunnions of the other pair, rotary members having bifurcated end portions supporting the respective pairs of trunnions, a separate bearing cup for each trunnion engageable in the corresponding furcation of said rotary members, a bearing plate overlying the base of said bearing cup and removably secured to said furcation to hold said bearing cup assembled on said trunnion, means for preventing relative rotation between said bearing plate and bearing cup including a non-circular aperture in said bearing plate and a boss of mating non-circular cross-section on said bearing cup received in said aperture, a threaded aperture in said boss, means normally sealing said apertures against the escape of lubricant from said bearing cup including a cap screw extending through said first and second mentioned apertures in threaded engagement with the latter, a first washer of flexible, compressible sealing material surrounding said cap screw and resting on the end of said boss, and a second metal washer surrounding said cap screw between the head of the latter and said first washer being resiliently clamped by said head against said bearing plate and compressing said first washer into sealing engagement with said end of said boss and said second washer.

6. A universal joint as in claim 5 in which said bearing plate is removably secured to said furcation by cap screws, and a length of wire extending through the heads of all of said cap screws to lock them against rotation.

7. A universal joint comprising a center member having pairs of trunnions with the axes of each pair in the same plane at right angles to the axes of the trunnions of the other pair, rotary members having bifurcated end portions supporting the respective pairs of trunnions, a separate bearing cup for each trunnion engageable in the corresponding furcation of said rotary members, a bearing plate overlying the base of said bearing cup to hold said bearing cup assembled on said trunnion, cap screws removably securing said bearing plate on said furcation, means for preventing relative rotation between said bearing plate and bearing cup including a non-circular aperture in said bearing plate and a boss of mating non-circular cross-section on said bearing cup received in said aperture, a threaded aperture in said boss, means normally sealing said apertures against the escape of lubricant from said bearing cup including a cap screw extending through said first and second mentioned apertures in threaded engagement with the latter, a washer of flexible, compressible sealing material surrounding said last-mentioned cap screw and resting on the end of said boss, and a lock strap through which said cap screws pass overlying said bearing plate, said lock strap being resiliently clamped by the head of said last-mentioned cap screw against said bearing plate and compressing said washer into sealing engagement with said end of said boss and said lock strap, said lock strap having bent-up ears resiliently engaging the heads of said first-mentioned cap screws to prevent accidental rotation thereof and said last-mentioned cap screw held against accidental rotation by the resilient engagement of said lock strap with the head thereof.

8. In a universal joint of the type comprising a center member having pairs of trunnions with the axes of the trunnions of each pair in the same plane at right angles to the axes of the trunnions of the other pair, rotary members having bifurcated end portions supporting the respective pairs of trunnions, a separate bearing for each trunnion fitting tightly in the corresponding furcation of the rotary members, a bearing plate overlying said bearing to hold the same in assembled relation on said trunnion, and screws for releasably securing said bearing plate on said furcation; means for removing each bearing from its furcation comprising said screws and said bearing plate, said bearing plate being released by said screws and resting on said screws in spaced overlying relation to said bearing, a threaded socket on said bearing, and a screw freely passing through an aperture in said bearing plate and threadedly engaging said socket, said last-mentioned screw having a head larger than the aperture in said bearing plate on the side of said bearing plate away from said bearing so that said plate serves as an abutment for said head during rotation of said last-mentioned screw to remove said bearing.

9. In a universal joint of the type comprising a center member having pairs of trunnions with the axes of the trunnions of each pair in the same plane at right angles to the axes of the trunnions of the other pair, rotary members having bifurcated end portions supporting the respective pairs of trunnions, a separate bearing for each trunnion fitting tightly in the corresponding furcation of the rotary members, and a bearing plate overlying said bearing and releasably secured to said furcation; means for removing each bearing from its furcation comprising said bearing plate, posts removably mounted on said furcation upon which said bearing plate, when released from said furcation, is adapted to rest in spaced overlying relation to said bearing, a threaded socket on said bearing, and a screw freely passing through an aperture in said bearing plate and threadedly engaging said socket, said screw having a head larger than the aperture in said bearing plate on the side of said bearing plate away from said bearing so that said plate serves as an abutment for said head during rotation of said screw to remove said bearing.

10. In a universal joint of the type comprising a center member having pairs of trunnions with the axes of the trunnions of each pair in the same plane at right angles to the axes of the trunnions of the other pair, rotary members having bifurcated end portions supporting the respective pairs of trunnions, and a separate bearing for each trunnion fitting tightly in the corresponding furcation of the rotary members; means for removing said bearings from their furcations comprising a U-shaped member adapted to straddle a bearing with its ends engaging the corresponding furcation and its midportion overlying said bearing in spaced relation thereto, a threaded socket on said bearing, and a screw freely passing through an aperture in the midportion of said U-shaped member threadedly engaging in said socket, said screw having a head larger than the aperture in the midportion of said U-shaped member on the side of said midportion away from said bearing so that said plate serves as an abutment for said head during rotation of said screw to remove said bearing.

11. In a universal joint as in claim 10, in which the legs of said U-shaped member are rigidly connected by the midportion thereof, and said furcations each have recesses on either side of the associated bearing removably receiving said legs during removal of said bearing.

12. In a universal joint of the type comprising a center member having pairs of trunnions with the axes of the trunnions of each pair in the same plane at right angles to the axes of the trunnions of the other pair, rotary members having bifurcated end portions supporting the respective pairs of trunnions, and a separate bearing for each trunnion fitting tightly in the corresponding furcation of the rotary members, means for removing a bearing from a recess in one of said rotary members, comprising a threaded socket in said bearing, a plate mounted on said support over said bearing, and a screw freely passing through an aperture in said plate and threadedly engaging said socket, said screw having a head larger than said aperture on the side of said plate away from said bearing so that said plate serves as an abutment for said head during rotation of said screw to remove said bearing.

13. In a universal joint of the type comprising a center member having pairs of trunnions with the axes of the trunnions of each pair in the same plane at right angles to the axes of the trunnions of the other pair, rotary members having bifurcated end portions supporting the respective pairs of trunnions, and a separate bearing for each trunnion fitting tightly in the corresponding furcation of the rotary members, means for removing a bearing from a recess in one of said rotary members, comprising a threaded socket in said bearing, a screw threadedly engaging said socket, and stop means above said bearing for limiting axial movement of said screw toward said bearing so that rotation of said screw when engaged by said stop means will effect removal of said bearing.

14. In a universal joint of the type comprising a center member having pairs of trunnions with the axes of the trunnions of each pair in the same plane at right angles to the axes of the trunnions of the other pair, rotary members having bifurcated end portions supporting the respective pairs of trunnions, a separate bearing for each trunnion fitting tightly in the corresponding furcation of the rotary members, and a bearing plate overlying said bearing to hold the same in assembled relation on said trunnion, and screws for releasably securing said bearing plate on said furcation; means for removing each bearing from its furcation comprising said bearing plate, posts removably mounted on said furcation upon which said bearing plate, when released from said furcation, is adapted to rest in spaced overlying relation to said bearing, a threaded socket on said bearing, and a screw freely passing through an aperture in said bearing plate and threadedly engaging said socket, said screw having a head larger than the aperture in said bearing plate on the side of said bearing plate away from said bearing so that said plate serves as an abutment for said head during rotation of said screw to remove said bearing.

References Cited in the file of this patent

UNITED STATES PATENTS

| | | |
|---|---|---|
| 1,636,796 | Alexander | July 26, 1927 |
| 1,993,357 | Braun et al. | Mar. 5, 1935 |
| 2,113,755 | Billington | Apr. 12, 1938 |
| 2,190,041 | Padgett | Feb. 13, 1940 |
| 2,380,646 | Harrington | July 31, 1945 |
| 2,575,602 | Stillwagon | Nov. 20, 1957 |
| 2,839,904 | Zeller | June 24, 1958 |

FOREIGN PATENTS

| | | |
|---|---|---|
| 219,828 | Great Britain | Aug. 7, 1924 |